US008447297B2

(12) United States Patent
Zhang et al.

(10) Patent No.: US 8,447,297 B2
(45) Date of Patent: *May 21, 2013

(54) APPARATUS, AND ASSOCIATED METHOD, FOR FACILITATING CONTROL OF CONTROL SIGNALING PERFORMED BY A MOBILE NODE OPERABLE IN A RADIO COMMUNICATION SYSTEM

(75) Inventors: Hongjun Zhang, Waterloo (CA); Ashok C. Patel, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1003 days.

This patent is subject to a terminal disclaimer.

(21) Appl. No.: 12/358,092

(22) Filed: Jan. 22, 2009
(Under 37 CFR 1.47)

(65) Prior Publication Data
US 2009/0131051 A1   May 21, 2009

Related U.S. Application Data

(63) Continuation of application No. 10/776,986, filed on Feb. 11, 2004, now Pat. No. 7,499,703.

(60) Provisional application No. 60/447,283, filed on Feb. 14, 2003.

(51) Int. Cl.
*H04W 4/00* (2009.01)

(52) U.S. Cl.
USPC ........ 455/435.1; 455/437; 455/321; 455/440; 455/517; 370/328; 370/345; 370/310.2; 370/330

(58) Field of Classification Search ............... 455/435.1, 455/437, 32.1, 440, 517; 370/328, 310.2, 370/345, 330
See application file for complete search history.

(56) References Cited

U.S. PATENT DOCUMENTS

| | | | |
|---|---|---|---|
| 4,972,355 A | 11/1990 | Mullins | |
| 6,002,940 A | 12/1999 | Richter | |
| 6,463,286 B1 | 10/2002 | Salminen | |
| 6,571,289 B1 | 5/2003 | Montenegro | |
| 6,766,168 B1 | 7/2004 | Lim | |
| 6,954,442 B2 | 10/2005 | Tsirtsis et al. | |
| 7,171,215 B2 | 1/2007 | Khouaja et al. | |
| 7,499,703 B2* | 3/2009 | Zhang et al. | 455/435.1 |
| 2004/0002338 A1* | 1/2004 | Spartz et al. | 455/450 |

FOREIGN PATENT DOCUMENTS

| | | |
|---|---|---|
| EP | 0994604 A2 | 4/2000 |
| WO | 00/79760 A1 | 12/2000 |
| WO | 01/97549 A1 | 12/2001 |
| WO | 03/055265 A1 | 7/2003 |

OTHER PUBLICATIONS

Mouly, et al., "GSM—The System for Mobile Communications", Cell & Sys, France, 1992, pp. 368-373, XP-001204974.

* cited by examiner

*Primary Examiner* — Sanh Phu

(57) ABSTRACT

Apparatus (48), and an associated method, for facilitating effectuation of control over when a mobile node (12) operable in a communication system (10) generates control signaling pursuant to a control procedure (62), such as a network search and selection procedure (64) or a registration procedure (66). A determiner (52) determines whether prior-sent control signals appear to have been successfully delivered to the network. If not, a selector (54) selects whether to increase a wait period prior to commencement of a subsequent control procedure, such as another network searching and selection procedure.

21 Claims, 3 Drawing Sheets

APPARATUS, AND ASSOCIATED METHOD, FOR FACILITATING CONTROL OF CONTROL SIGNALING PERFORMED BY A MOBILE NODE OPERABLE IN A RADIO COMMUNICATION SYSTEM

CROSS REFERENCE TO RELATED APPLICATION

This application is a continuation application of patent application Ser. No. 10/776,986 filed on Feb. 11, 2004, which claims the benefit of priority to U.S. Provisional Application No. 60/447,283 filed on Feb. 14, 2003, the contents of all of which are incorporated herein by reference.

The present invention relates generally to a manner by which a mobile node operable in a radio communication system performs control signaling with a network part, such as a public land mobile network (PLMN) of a cellular communication system. More particularly, the present invention relates to apparatus, and an associated method, by which to control when the control signaling is generated, pursuant, e.g., to a network searching or a registration procedure, at the mobile node for communication to the network part. When a determination is made that the mobile node has likely been unable successfully to deliver signals to the network part, the control signaling generated by the mobile node is limited, thereby reducing power-consumption at the mobile node. When the mobile node is powered by a battery power supply, the battery-life of the battery power supply is extended, reducing the frequency by which a user of the mobile node is required to recharge or replace the battery power supply of the mobile node.

BACKGROUND OF THE INVENTION

An endemic need of modern society is the need to communicate. Data regularly must be communicated, sometimes between widely dispersed locations. Communication systems, formed at a minimum of sending and receiving stations interconnected by way of a communication channel, are used to effectuate the communications. Many different types of communication services are regularly effectuated by large numbers of users through use of many varied types of communication systems.

New types of communication systems have been developed and implemented as a result of scientific discoveries and technological advancements. Technological advancements continue, and their deployment in communication systems correspondingly continue. New communication systems are developed, and improvements to existing communication systems are made, as a result of such deployment. Such new, as well as improved, communication systems permit the effectuation of new types of communication services or the effectuation of such services in manners not previously possible.

Amongst the technological advancements that have been deployed in communication systems are advancements in digital communication techniques. Several advantages are inherent in communication systems that utilize digital communication techniques. Perhaps most significantly, the use of digital communication techniques generally provide for improved communication efficiencies. That is to say, the communication capacity of a communication system that utilizes digital communication techniques is generally significantly greater than the communication capacity permitted in a communication system that utilizes analog communication techniques.

A radio communication system is an exemplary type of communication system. A radio communication system is referred to as such as the communication channel that interconnects the sending and receiving stations is defined upon a radio link, at least for a portion of a communication path extending between the communication stations of the radio communication system.

A radio communication system provides various advantages relative to a conventional, wireline communication system. For instance, implementation of a radio communication system is generally performed more economically than a wireline counterpart. That is to say, the infrastructure costs associated with a radio communication system are generally less than the costs associated with installation of a network infrastructure of a wireline communication system. So, for reasons associated with initial deployment costs, radio communication systems are sometimes preferred over their wireline counterparts. Also, a radio communication system can be implemented as a mobile communication system, thereby to provide mobility of communications. Communications in such a system are possible, from and between, locations at which the use of a conventional, wireline communication system would be impractical. And, communications between moving communication stations, herein referred to as mobile nodes, is sometimes also possible.

A cellular communication system is a type of radio communication system that has achieved wide levels of usage. The networks of several different types of cellular communication systems have been installed throughout significant geographical areas and encompass significant portions of the populated areas of the world. Successive generations of cellular communication systems have been developed and deployed, and successor-generation systems are undergoing deployment or are under development. So-called, first generation (1G) cellular communication systems generally utilize analog communication techniques and provide for voice communications using circuit-switched connections. So-called, second generation (2G) cellular communication systems generally utilize digital communication techniques and provide for some data services. 2.5G (second and a half generation) and 3G (third generation) systems are currently undergoing deployment, and successor-generation systems are under development. These later-generation systems generally provide, or are intended to provide, amongst other things, more extensive data communication services.

For many, use of a cellular communication system through which to communicate has become an essential, sometimes even the primary, means by which to communicate telephonically. As indicated above, cellular communication systems were initially used primarily for voice communications utilizing analog techniques. But, their use is increasingly to effectuate data communication services, and development of new-generation systems are, in no small part, predicated upon their ability to provide for the effectuation of data communication services.

In most cellular communication systems, various control procedures must be carried out in order for a mobile node to be operable to communicate by way of the communication network of the communication system. Other radio communication systems sometimes also have analogous control procedures that analogously must be carried out in order for the mobile node to be able to communicate by way of the associated communication network. While some control procedures are specific to the particular type of communication service that is to be carried out, other control procedures must be carried out irrespective of the communication service that is to be carried out. And, more specifically, some control procedures must be carried out merely to permit the mobile node to be available for subsequent use, that is, to be available subsequently to perform a communication service.

Because a mobile node is not maintained in an affixed connection with a network by way of a wireline connection, the mobile node must, in some manner, find, select and become attached to the network with which the mobile node is to communicate. A network searching procedure is performed by the mobile node to locate and select the selected network with which the mobile node is to become attached or otherwise communicate. Control signaling is required to be generated by the mobile node pursuant to the network searching and selection procedure.

And, once the mobile node locates the selected network through the searching procedure, the mobile node must become registered with the network. Through the registration procedure, various indicia associated with the mobile node are provided to the network, such as the identity of the mobile node and the location of a home network associated with the mobile node. Various procedures are sometimes subsumed into the registration procedure. For instance, authentication procedures sometimes are considered to be part of a registration procedure. In an authentication procedure, the identity of the mobile node is verified, i.e., authenticated. Improper, or fraudulent, access to the network is prevented. Again, control signaling is required to be generated by the mobile node pursuant to the registration procedure. Registration procedures are sometimes repeated at selected intervals subsequent to initial registration by the mobile node when the mobile node is initially powered-on.

Additional procedures are carried out subsequent to registration. For instance, routing area updating and location updating procedures are selectably performed by the mobile node. As a mobile node is mobile, the mobile node might well be initially positioned at one location and thereafter travel to another location. Routing areas and location areas are defined in some cellular communication systems. Routing areas and location areas are typically associated with groups of cells. When the mobile node passes into a new routing area or a new location area, the mobile node performs a routing area update or location area update procedure, as appropriate. In such a procedure, the network is alerted to the change of positioning of the mobile node out of one area and into another area. Subsequent communications with the mobile node are able more efficiently and quickly to be directed through the network for delivery to the mobile node. Again, control signaling is required to be generated by the mobile node pursuant to the routing area update and the location area update procedures.

The mobile node, typically, is powered by a portable power supply, of limited energy-storage capacity. When the portable power supply, i.e., a battery power supply, is depleted of stored energy, the mobile node no longer functions properly, if at all. And, the portable power supply must be replaced or recharged to permit continued use of the mobile node. User satisfaction with the mobile node is, at least in some respect, dependent on the longevity of the portable power supply. So, efforts are regularly made to reduce the power consumption rate of the mobile node.

Each time in which control signaling is generated at the mobile node, power is consumed, and the stored energy of the battery power supply is depleted. While the control signaling to perform the various control procedures is necessary to permit operation of the mobile node in the communication system, problems occur when the mobile node is positioned in an area of marginal, or no, coverage by the communication network. When so-positioned, signals generated by the mobile node are unlikely, or are unable, to be delivered successfully to the network part.

When, for instance, a network selection or a registration procedure is not successfully performed by a conventional mobile node, the mobile node continues to attempt the procedure, generating control signals in such attempts. The continued generation of the control signals is power-consumptive and depletes the stored energy of the battery power supply that typically powers the mobile node. And, more frequent replacement, or recharging of, the battery power supply is necessitated.

Accordingly, if a manner could be provided by which better to control when to permit control signaling to be generated at a mobile node, increased longevity of the battery power supply would be provided, and improved user satisfaction of use of the mobile node would be possible.

It is in light of this background information related to communications in a radio communication system that the significant improvements of the present invention have evolved.

SUMMARY OF THE INVENTION

The present invention, accordingly, advantageously provides apparatus, and an associated method, by which a mobile node operable in a radio communication system performs control signaling, such as pursuant to a network-searching or a registration procedure with a network part, such as a public land mobile network (PLMN) of a cellular communication system.

Through operation of an embodiment of the present invention, a manner is provided by which to control when the control signaling is generated at the mobile node for communication to the network part.

Generation of control signaling associated with repeated attempts to perform control procedures when the mobile node is in a marginal, or out-of-coverage, area is reduced. When a determination is made that the mobile node is unlikely to be able successfully to deliver the control signals to the network part pursuant to a control procedure, the control signaling generated by the mobile node is limited. Power consumption at the mobile node is reduced, reducing the rate at which stored energy stored at a battery power supply is depleted.

Subsequent generation of control signaling associated with the control procedures are made in controlled manners that are less energy-consumptive than that required by conventional techniques. When the mobile node is battery-powered, longer battery-life of a battery power supply is provided, and the frequency by which a user of the mobile node is required to replace or recharge the battery power supply of the mobile node is reduced.

In one aspect of the present invention, the mobile node operates pursuant to a registration procedure by which to register the mobile node in a PLMN (public land mobile network), or other network part, of a radio communication system. When the registration procedure is initiated, other selected control procedures are stopped or prevented from being initiated. For instance, when a registration procedure is started and control signaling is to be generated by the mobile node pursuant to the registration procedure, performance of a routing area update procedure by the mobile node is prohibited or stopped. Analogously, when the registration procedure is started and control signaling is to be generated by the mobile node pursuant to the registration procedure, performance of a location updating procedure is prohibited or stopped. By preventing performance of the routing area update procedure or performance of a location update procedure during performance of the registration procedure, or an attempt thereof, unnecessary control signaling is avoided.

When the other selected control procedures are prohibited or stopped, activities associated with such procedures at the mobile node are also stopped. By preventing the generation of the control signaling pursuant to the other selected control procedures, energy-consumption of the stored energy at the battery power supply that powers the mobile node is reduced. And, increased battery longevity is possible.

In another aspect of the present invention, a determination is made as to whether previously-sent control signaling has been successfully delivered to the network part. If a determination is made that the previously-sent control signaling has not been successfully delivered to the network part, a conclusion is made that the mobile node is in an out-of-coverage, or marginal coverage, area. And, upon such a determination, the mobile node is placed in a limited-access state. When placed in the limited-access state, additional control is exerted over when the mobile node is permitted to perform, again, the control signaling associated with the registration procedure.

A determination is made, for instance, that the previously-sent control signaling has not been successfully delivered to the network part if the mobile node is unable to gain access to a selected logical layer of the network part pursuant to a registration procedure. The selected logical layer is, e.g., the RLC/MAC (radio link control/medium access control) layer of the network part. Through such determination, additional control is exerted over when to permit subsequent control procedures associated with accessing the network part to be made. And, by limiting when the subsequent registration-procedure attempts are made, the control signaling associated with such subsequent requests is reduced. If the mobile node is positioned at an out-of-coverage, or marginal coverage, area, control signaling that would not be successfully delivered to the network part is generated in a more-controlled manner. Thereby, battery depletion is reduced while also permitting attempts to perform the control procedures to be made in the event that the mobile node enters an area at which access to the network part is available.

In another aspect of the present invention, the wait, i.e., delay, period between successive network searching procedures by the mobile node is selectably altered. The selectable alteration of the delay period is made subsequent to determination that the mobile node has been unable to access the network part. Through alteration of the delay period, the frequency by which the control signaling associated with the network searching procedure is generated is correspondingly altered. When a selected number of network searching procedures have been performed, without successful access to the network, the wait period prior to grant of permission again to perform a network searching procedure is increased. The increase in the wait period is, for instance, an increase that is directly proportional to the number of network searches that have already been performed, without success. And, with each subsequent network searching procedure that fails to result in access by the mobile node to the network, the wait period is increased, up to a maximum wait period. A searching timer is used, for instance, to time the wait period. Upon expiration of the searching timer, a subsequent network searching procedure, and the control signaling associated therewith, is permitted to commence.

Thereby, the generation of control signaling associated with control procedures performed by the mobile node is controlled. When a registration procedure commences, other control procedures that might be performed by the mobile node are prohibited or otherwise stopped. And, upon a determination that the mobile node is unable to gain access to the network part of the communication system, the mobile node is placed in a limited access state. When in the limited access state, the frequency by which network searching attempts are permitted to be made by the mobile node is selectably reduced. That is to say, wait periods between successive network searching attempts are selectably increased, thereby to reduce the control signaling generated by the mobile node. Through such control of generation of the control signaling by the mobile node, increased battery life is possible. Power-consumptive control signaling associated with various control procedures performed by the mobile node is limited, reducing energy consumption that would otherwise occur in the absence of such control.

In these and other aspects, therefore, apparatus, and an associated method, is provided for a radio communication system having a mobile node selectably operable to communicate with a network part by way of a radio link formed therebetween. Control of when control signaling is generated at the mobile node for communication to the network part is facilitated. A determiner is adapted to receive indications indicating whether a prior-sent control signal sent by the mobile node has been successfully delivered to the network part. The determiner is operable responsive thereto for determining whether the network part of the radio communication system is accessible by the mobile node. An access-attempt-time selector is operable responsive to a determination by the determiner of less than a selected level of access to the network part of the radio communication system by the mobile node. The access-attempt-time selector selects when to permit transmission of a subsequent control signal by the mobile node to attempt access to the network part of the communication system.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
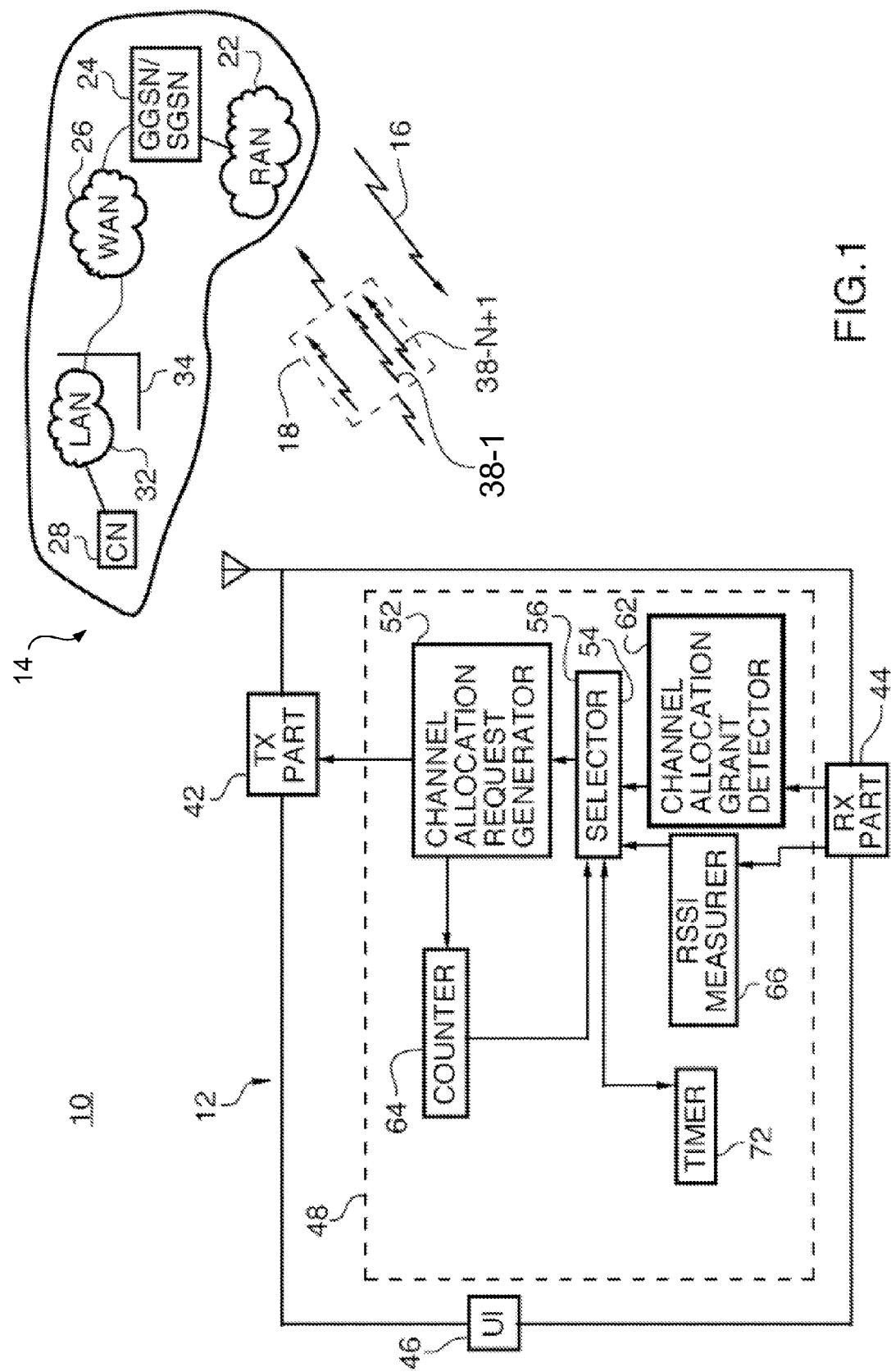
FIG. 1 illustrates a functional block diagram of a communication system in which an embodiment of the present invention is operable.

Referring first to FIG. 1, a communication system, shown generally at 10, is illustrated. The communication system here is a multi-user communication system that provides for radio communications with a plurality of mobile nodes. For purposes of explanation of operation of an embodiment of the present invention, a single mobile node 12 is shown in the Figure. Other mobile nodes can, of course, be analogously be represented.

The communication system 10 is here representative of a cellular communication system. And, the following description shall describe exemplary operation of the communication system with respect to an implementation in which the communication system 10 forms a GSM (Global System for Mobile communications) system that provides GPRS (General Packet Radio Service). It should be understood at the outset, however, that the teachings of the present invention are analogously also implementable in other types of cellular communication systems and also implementable in other types of radio communication systems. Operation of an embodiment of the present invention can, therefore, analogously also be described with respect to its implementation in any of various other types of radio communication systems, such as, without limitation, any communication system in which a mobile node performs control procedures including control signaling.

The communication system provides for the effectuation of communication services, here packet-switched GPRS communications as well as circuit-switched voice, and other, communications. Data pertaining to such services, herein referred to as traffic data, is communicated between the mobile node 12 and a network part 14 of the communication system by way of channels defined upon radio links formed between the mobile node and the network part. Data sourced at the network part of the communication system is sent to the mobile node upon forward link channels defined upon a forward link 16, and data sourced at the mobile node is sent to the network part upon reverse link channels defined upon a reverse link 18.

Additional signaling, in addition to communication of signals containing traffic data, is communicated upon the forward and reverse link channels. The additional signaling, herein referred to as control signaling is generated pursuant to control procedures that are carried out, usually preparatory to allocation of traffic channels used upon which to communicate the traffic data. Details of the parameters, formatting, and other definitional criteria associated with the signaling can be found in the operating specification defining operation of the communication system 10. For purposes of explaining operation of an embodiment of the present invention, the control signaling that is performed during operation of the communication system is performed pursuant to various control procedures, some of which are initiated by the mobile node 12.

The network part 14 of the communication system is here shown to include a public land mobile network (PLMN) 22. While not separately illustrated, the public land mobile network includes, amongst other things, base transceiver stations that communicate by way of the forward and reverse links with the mobile node 12. The public land mobile network further includes other functional entities, such as base station controllers, that operate, in part, to control operation of the base transceiver stations of the mobile network.

The public land mobile network radio access network is coupled by way of a gateway 24 to a wide area network (WAN) 26. Here, in the exemplary implementation in which the communication system forms a GSM/GPRS system, the gateway is represented to include the functions of a GGSN (Gateway GPRS Service Node) and an SGSN (Serving GPRS Service Node). The functions provided by the GGSN and SGSN can, of course, be implemented elsewhere or in other manners.

The wide area network is here representative of the Internet or other packet data network. A correspondent node (CN) 28 is coupled to the wide area network, here by way of a local area network (LAN) 32. And, the local area network is here shown to be positioned behind a firewall 34.

As just-noted, various control procedures are initiated by the mobile node 12 during operation of the communication system. The control procedures are generally necessary to enable the mobile node to communicate traffic data with the network part, and such control procedures must be successfully carried out so that the traffic data can thereafter be communicated to effectuate a communication service.

A network selection procedure is an exemplary such control procedure. Because the mobile node is not fixedly connected to a network, the network must first be located and selected by the mobile node. The mobile node locates the network, for instance, by tuning to channels upon which broadcasts by base transceiver stations are believed to be generated. And, control signaling is generated by the mobile node pursuant to the network selection procedure, such as to alert the selected network of its selection by the mobile node.

A registration procedure is another exemplary control procedure that is initiated by a mobile node. A registration procedure is required to register the mobile node with the selected network. Various indicia associated with the mobile node are provided to the selected network to identify the mobile node to the network, thereby to register the mobile node with the network. Authentication procedures by which the mobile node is authenticated with the network are sometimes considered to be part of the registration procedure. Through registration of the mobile node with the network, the mobile node becomes available, as a network node, to send and receive data, such as traffic data communicated pursuant to effectuation of a communication service. To perform the registration procedure, control signaling is generated by the mobile node and communicated to the network part of the communication system.

Other exemplary control procedures include routing area update procedures and location updating procedures. Due to the mobility inherent of a mobile node, the position at which the mobile node is located might change. That is, a mobile node, initially positioned in a first location might travel to another location. The other location might be in a separate routing area, or another location necessitating different attachment to the network. When, for instance, the mobile node enters a new routing area, a routing area update procedure is carried out. And, updating procedures to update the location of the mobile node are carried out at selected intervals. Again, control signaling is performed by the mobile node when such control procedures are carried out.

In the exemplary implementation in which the PLMN 22 and mobile node 12 of the communication system are operable pursuant to the operating specification of the GSM/GPRS system, the control signaling is performed, at least in part, upon random access channels (RACHs) defined upon the reverse link 18. In other implementations, control signaling is performed upon channels defined for the associated communication system. While generation of the control signaling is necessary to perform the various control procedures, such generation is power-consumptive.

Proper operation of the mobile node is predicated upon the positioning of the mobile node at a location in which the mobile node is able to deliver signals to the PLMN and in which the mobile node is able to receive signals sent by the PLMN. However, the mobile node might be positioned, or travel to, a position that provides only marginal coverage. Or, the mobile node might be positioned, or travel to, an out-of-coverage position in which the mobile node is wholly unable to deliver signals to the PLMN. In either position, the mobile node is unable to communicate acceptably with the PLMN. And, e.g., control procedures can not be successfully completed. Conventional mobile nodes sometimes exhibit problems when control procedures are started and the mobile node is, or moves to, a marginal-coverage area or an out-of-coverage area.

In particular, conventional mobile nodes generally do not provide a manner to avoid repeated generation of control signaling with respect to performance of the control procedures that are initiated, or otherwise carried out, thereat. And, separate control procedures might well also be attempted during concurrent time periods, each requiring generation of control signaling by the mobile node. Such generation of the control signaling, with little, or no, likelihood of successful completion of the associated control procedure is unnecessarily power-consumptive. Battery drain of the battery power supply that typically powers the mobile node results, necessitating more frequent battery recharging or battery replacement than otherwise would be necessary.

Pursuant to an embodiment of the present invention, the mobile node 12 operates in a manner in which better control is exerted over when control procedures, and the associated control signaling, are carried out. Network selection and registration procedures, for instance, are better controlled when the control signaling associated with such procedures appear unlikely to be deliverable successfully to the PLMN. Through the better control over when the control procedures, and associated control signaling, is permitted to be carried out, excessive power-consumption, otherwise caused as a result of generation of excessive control signaling, is avoided.

The mobile node 12, forming a radio transceiver, is here shown to include a transmit (TX) part 42 and a receive (RX) part 44. The transmit part 42 operates to send signals upon the reverse link to the public land mobile network. And, the receive part operates to receive signals generated during operation of the communication system 10. The signals sent and received during operation of the transmit and receive parts of the mobile node include signals containing traffic data as well as control signals. The transmit and receive parts are each coupled to a user interface (UI) 46. The user interface includes, for instance, both a user display and input actuators, such as an input keypad.

The mobile node also includes apparatus 48 of an embodiment of the present invention. The apparatus 48 is functionally represented in the Figure. And, the apparatus is shown to be formed of functional elements that are implementable in any desired manner. In the exemplary implementation the functional elements of which the apparatus 48 is comprised are formed, at least in part, of algorithms executable by processing circuitry of the mobile node. And, in such an implementation, the apparatus is embodied, at least in part, at the processing circuitry. The functions of the various elements can, of course, be implemented in other manners. And, the elements of which the apparatus 48 is formed can be implemented at any structure of the mobile node, such as at, or within, the structure of the transmit and receive parts 42 and 44.

The apparatus 48 includes a determiner 52. The determiner 52 is coupled to receive indications, here by way of a line extending from the receive part 44, that indicate whether the prior-sent control signals have been successfully delivered to the public land mobile network. The receive part receives, from the PLMN, responses to the control signals when the control signals are successfully delivered to the PLMN. And, indications of reception of such signals are provided to the determiner. Conversely, when the control signals are not successfully delivered to the PLMN, no corresponding responses are returned to the mobile node, and the determiner instead does not receive indications of successful delivery of the prior-sent control signals. The determiner, responsive to the indications, determines whether the prior-sent control signals have been successfully delivered to the PLMN. And, by so doing, the determiner also effectively determines whether the mobile node is positioned at a location encompassed by the PLMN.

The apparatus 48 further includes an access-attempt-time selector 54 that is coupled to receive indications of the determinations made by the determiner. The selector 54 operates to select a wait time, i.e., a delay period, prior to granting permission for the mobile node to generate additional control signaling pursuant to a control procedure. The delay period is selectable, and the selection of the delay period, here, is dependent upon determinations made by the determiner 52. As shall be described more fully below, in the exemplary implementation, the selector invokes operation of a wait period selector, here a wait time algorithm 56. The wait time algorithm selects the delay period. When a determination is made by the determiner that the mobile node has not successfully delivered the prior-sent control signaling to the PLMN, the access-attempt-time selector invokes operation of the wait time algorithm, and the wait time period is calculated.

The apparatus further includes a counter 58 that is coupled to receive indications of prior procedures attempted to be carried out by the mobile node. The counter maintains a count value of the prior attempts. And, indications of the count value are also provided to the access-attempt-time selector 54. In the exemplary implementation, the count value is utilized by the wait time algorithm when the algorithm is invoked to calculate the wait time period. That is to say, the wait time period is further selectably calculated to be a function of the count value maintained by the counter. The counter is reset when the determiner determines, e.g., that prior-sent control signals have been delivered successfully to the PLMN or otherwise determines that the PLMN is accessible by the mobile node.

A control procedure element 62 is further shown to form part of the apparatus 48. The control procedure element is a functional representation of control procedures that are selectably carried out during operation of the mobile node. And, here, the control procedures include a network access/selection procedure 64, a registration procedure 66, a routing area update (RAU) procedure 68, and a location update (LU) procedure 72. As noted above, each of the control procedures has control signaling associated therewith. The mobile node generates the control signaling when attempting to carry out any of such procedures.

Here, selections made by the access-attempt-time selector, such as through invocation of the wait time algorithm, are provided to the control procedure element. Additionally through operation of an embodiment of the present invention, a control procedure that otherwise would be performed is permitted to be performed only upon expiration of the wait time selected by the selector 54. And, in the exemplary implementation, the wait time is selected responsive to determination that prior-sent control signals have not been delivered successfully to the public land mobile network and responsive to the count value maintained by the counter.

In the exemplary implementation, the selector 54 further operates selectably to prevent, or to stop, performance of selected control procedures. For instance, when a registration procedure is being performed, other control procedures are prohibited from commencing or are stopped. A routing area update procedure or a location update procedure, for instance, is prohibited by the selector upon performance of the registration procedure. Unnecessary routing area update procedures and location update procedures are thereby avoided.

Additionally, the mobile node is caused to enter into a special state, a limited PLMN access state, when the mobile node is determined by the determiner to be out of coverage or in a position at which the mobile node is unable successfully to deliver control signals to the PLMN. When in this special state, limitations are placed upon when the mobile node is permitted to perform control procedures, or control signaling, thereby selectably to reduce the amount of control signaling generated by the mobile node. The limitations here include, for instance, operation of the selector to increase the wait time.

Additionally, the selector further operates, in the exemplary implementation, to reset searching parameters stored at the mobile node only upon successful registration of the mobile node with the PLMN. The parameters include, for instance, the count value maintained at the counter. Through such operation, the mobile node is able to attempt PLMN registration at reasonable levels in terms of frequency.

Figure 2:
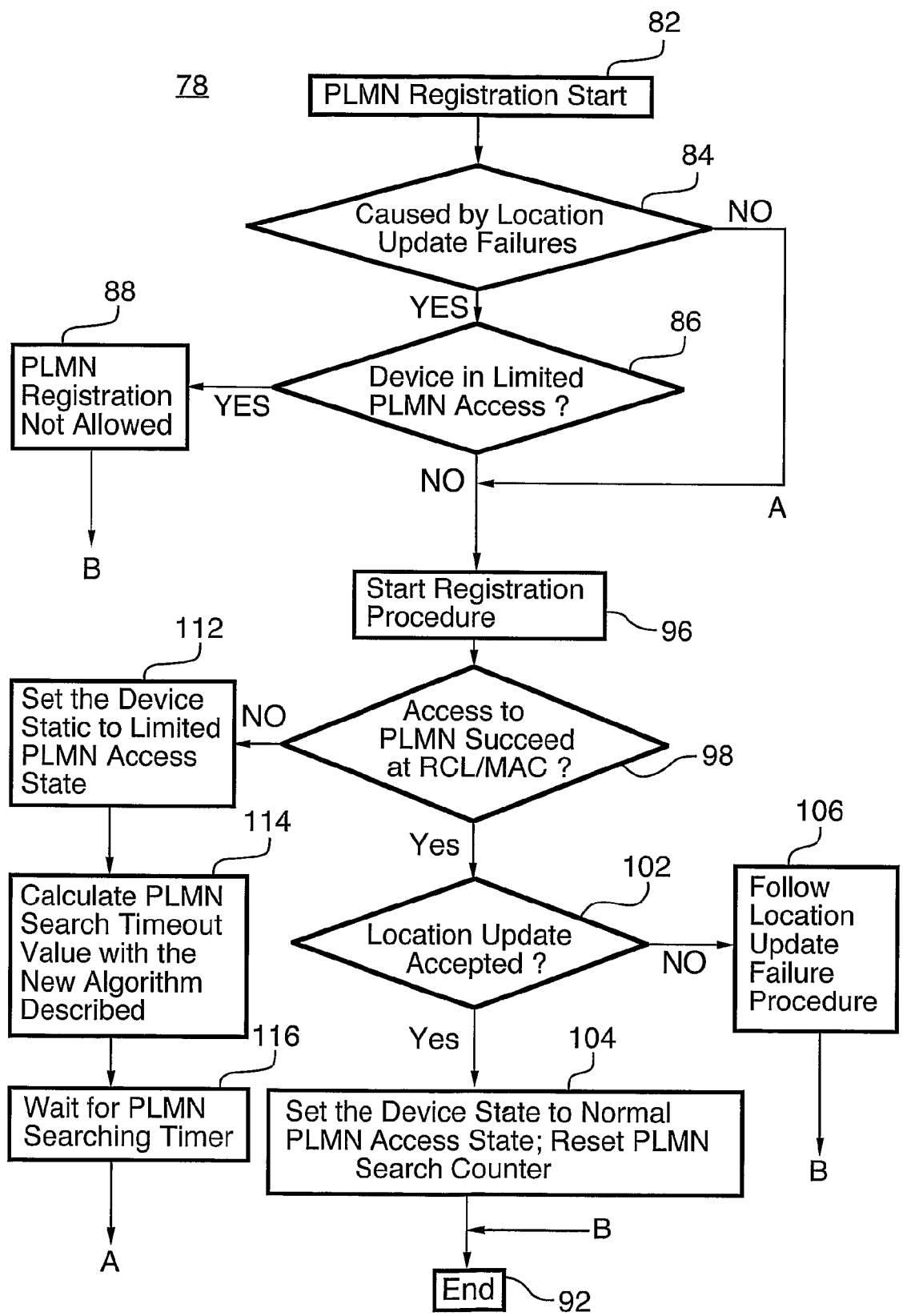
FIG. 2 illustrates a flow chart representative of exemplary operation of an embodiment of the present invention.

Turning next to FIG. 2, a flow chart, shown generally at 78, representative of operation of an embodiment of the present invention is illustrated. The functions and operations represented by the flow chart are implementable, for instance, by the apparatus 48, shown to form a portion of the mobile node 12 in FIG. 1.

Here, operation commences with the PLMN registration start block 82. Upon commencement of operations, registration of a mobile node with a PLMN is attempted. After commencement of operations, a path is taken to the decision block 84 at which a determination is made as to whether the attempt to register the mobile node is being implemented as a result of failure of one or more earlier location update procedures by the mobile node.

If so, the yes branch is taken to the decision block 86. At the decision block 86, a determination is made as to whether the mobile node is in a limited PLMN access state. If so, a branch is taken to the block 88, and PLMN registration procedures are not permitted to commence. And, a path (indicated by B in the Figure) is taken to the end block 92.

If the registration procedure is determined at the decision block 84 not to have been caused by earlier location update procedure failures or a determination at the decision block 86 is made that the mobile node is not in a limited PLMN access state, no branches (indicated by A in the Figure) are taken from the respective decision block to the block 96.

At the block 96, registration procedures commence. Upon commencement of the registration procedures, a path is taken to the decision block 98 at which a determination is made as to whether access to the PLMN has succeed at the RLC/MAC (radio link control/medium access control) layers of the communication system. If so, the yes branch is taken to the decision block 102. At the decision block 102, a determination is made as to whether a location update of the mobile node has been accepted.

If so, the yes branch is taken to the block 104, and the mobile node state is set to that of a normal PLMN access state, and the PLMN search counter is reset. A path is then taken to the end block 92. If, however, a determination is made at the decision block 102 that the location update of the mobile node has not been accepted, the no branch is taken to the block 106. At the block 106, a location update failure procedure is followed, and a path (indicated in the Figure by the path 'B') is taken to the end block 92.

If, conversely, a determination is made at the decision block 98 that the mobile node has been unable to access the PLMN at the RLC/MAC layer, the no branch is taken to the block 112. And, the mobile node state is set to a limited PLMN access state. A path is then taken to the block 114, and a PLMN search timeout value is calculated or otherwise selected. Additional description of the manner by which the timeout value is selected in the exemplary implementation shall be described below with respect to FIG. 3. And, upon calculation of the timeout value, i.e., the wait time or delay period, a path is taken to the block 116. At the block 116, the mobile node awaits timing out of the delay period associated with the calculations made at the operation 114. Then, a path is taken (indicated by A in the Figure) to the block 96.

Thereby, through operation of the mobile node pursuant to that described by the flow chart 78 of an exemplary implementation of an embodiment of the present invention, reduced levels of control signaling occur when the mobile node is determined to be at a location at which control signals appear not to be deliverable to the PLMN. Reduced levels of power consumption result, thereby improving battery longevity of the battery power supply that powers the mobile node.

Figure 3:
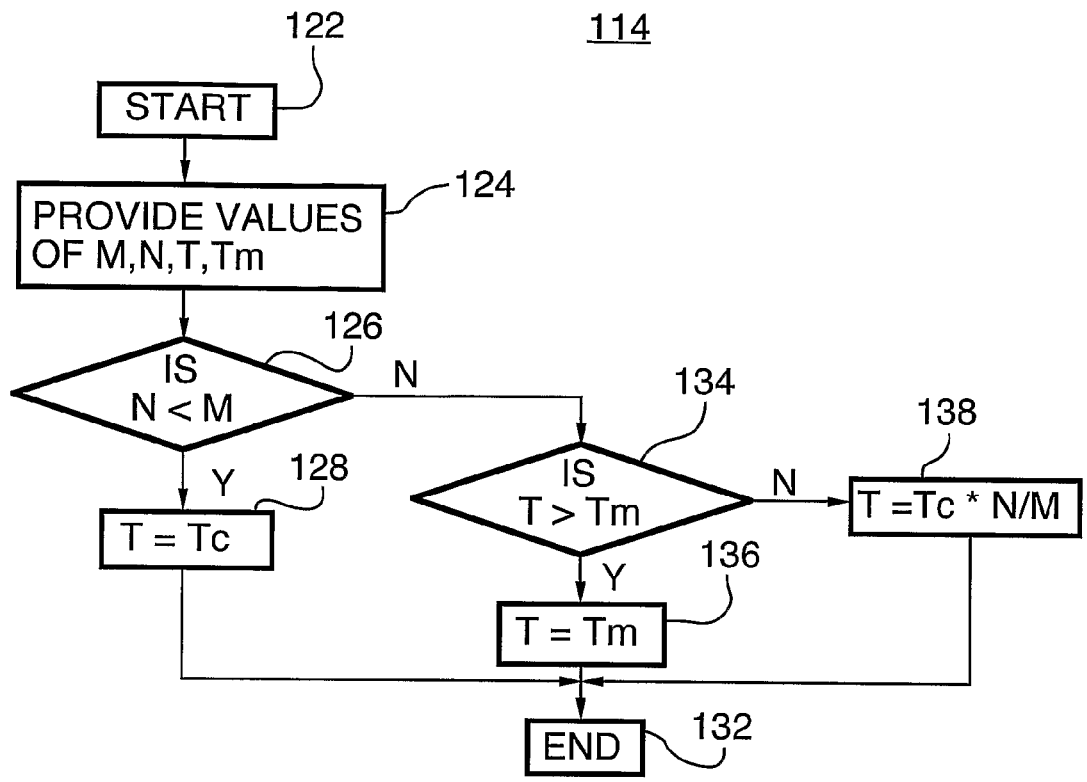
FIG. 3 illustrates a flow chart representative of exemplary operation of further operation of the embodiment of the present invention represented by the flow chart shown in FIG. 2.

FIG. 3 illustrates a flow chart, shown generally at 114, representative of exemplary operation of an embodiment of the present invention by which selection is made of the wait period between two consecutive PLMN searching procedures. The flow chart is commonly-referenced with the block 114 shown in FIG. 2, corresponding to the operations performed thereat in the exemplary implementation of the present invention.

The start block 122 represents commencement of the operations by which to calculate the wait time. Then, a path is taken to the block 124 at which values used to calculate the wait time are entered. Here, M indicates a predefined value of a number of network searching procedures previously carried out by the mobile node. T indicates the wait time that is calculated and subsequently used to define the wait period prior to commencement of a subsequent network searching and selection procedure. Tc indicates the existing wait time. N indicates the number of searches that have been performed by the mobile node. And, Tm indicates a value of a maximum wait time.

A path is then taken to the decision block 126 at which a determination is made whether the PLMN search number, N, is less than the value of M. If the value of N is less than M, the yes branch is taken to the block 128. And, the value of T is set as Tc. That is, the value of T remains constant. And, a path is taken to the end block 132.

If, conversely, a determination is made at the decision block 126 that N is at least as great as M, the no branch is taken to the decision block 134. At the decision block 134, a determination is made as to whether the value of T is greater than or equal to Tm. If so, the yes branch is taken to the block 136. And, the value of T is set at Tm. A path is then taken to the end block 132.

If, conversely, a determination is made at the decision block that T is less than Tm, the no branch is taken to the block 138. And, the value of T is set to be equal to Tc*N/M. The value of T is thereby made to be directly proportional to the number of prior network searching attempts.

And, in other words, if the PLMN search number, N, is less than M, then T equals Tc. Otherwise, T equals Tc*N/M unless T is greater than Tm. Otherwise, T equals Tm.

Figure 4:
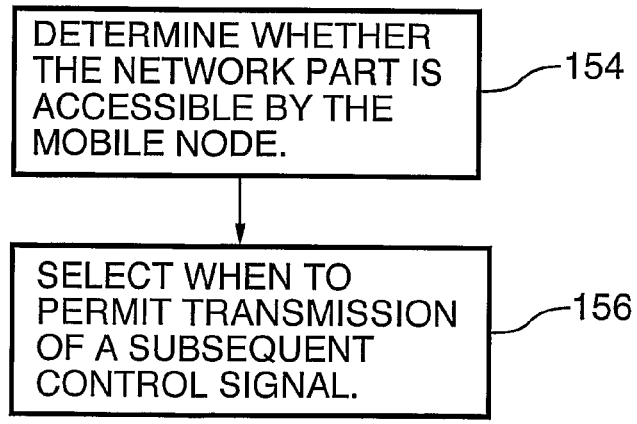
FIG. 4 illustrates a method flow diagram representative of the method of operation of an embodiment of the present invention.

FIG. 4 illustrates a method flow diagram, shown generally at 152, of the method of operation of an embodiment of the present invention. The method facilitates control of when control signaling is generated at a mobile node for communication by way of a radio link to a network part of a radio communication system.

First, and as indicated by the block 154, a determination is made as to whether the network part of the radio communication system is accessible by the mobile node. The determination is made responsive to indications indicating whether a prior-sent control signal sent by the mobile node has been successfully delivered to the mobile node.

Then, and as indicated by the block 156, selection is made of when to permit transmission of a subsequent control signal by the mobile node to attempt access to the network part of the communication system. The selection is made responsive to determination that the mobile node is able to access the network at less than a selected level of access.

Thereby, through operation of an embodiment of the present invention, a manner is provided by which to control when control signaling is generated at the mobile node for communication to the network part. Upon determination that the mobile node has likely been unable to successfully deliver signals to the network part, limitations are placed upon when subsequent control signals are generated pursuant to a control procedure. Thereby, battery power of a battery power supply that powers the mobile node is conserved.

The previous descriptions are of preferred examples for implementing the invention, and the scope of the invention should not necessarily be limited by this description. The scope of the present invention is defined by the following claims.

The invention claimed is:

1. A method for a mobile node operable to communicate with a network comprising:
   determining whether a network identified is not available for receiving signals from the mobile node;
   increasing a wait period that defines a delay prior to generation of additional signaling of a network search procedure by setting a search timer to an increased wait period value based on a determination that the identified network is not available for receiving signals from the mobile node; and
   initiating a network search procedure at the expiry of the wait period.

2. The method of claim 1 wherein determining whether a network identified is not available for communications with the mobile node is based on whether an indication that a previously sent control signal has been successfully delivered to the identified network.

3. The method of claim 1 wherein the previously sent control signal is generated as part of registration procedure.

4. A method for a mobile node operable to communicate with a network comprising:
   determining whether a network identified is not available for communications with the mobile node;
   setting a search timer to an increased wait period value for a wait period associated with a network search procedure based upon determination that the network identified is not available for communications with the mobile node; and
   initiating a network search procedure at the expiry of the wait period.

5. The method of claim 1 wherein the wait period is increased based on a number of unsuccessful attempts to access the network.

6. A method for a mobile node operable to communicate with a network comprising:
   determining whether a network identified is not available for receiving signals from the mobile node;
   increasing a wait period that defines a delay prior to generation of additional signaling of a network search procedure based on a determination that the identified network is not available for receiving signals from the mobile node;
   initiating a network search procedure at the expiry of the wait period; and
   identifying, based on the network search procedure, another network for communications with the mobile node.

7. The method of claim 1 wherein a determination that the identified network is not available for communications with the mobile node is made when the mobile node is not able to access a selected logical layer of the network.

8. The method of claim 7 wherein the selected logical layer is one of:
   an RLC and a MAC layer.

9. An apparatus for a mobile node operable to communicate with a network, said apparatus comprising:
   a determiner configured to determine whether a network identified is not available for receiving signals from the mobile node;
   search timer; and
   a selector configured to increase a wait period that defines a delay prior to generation of additional signaling of a network search procedure by setting a search timer to an increased wait period based on a determination by said determiner that the identified network is not available for receiving signals from the mobile node and to initiate a network search procedure at the expiry of the wait period.

10. The apparatus of claim 9 wherein said determiner is configured to determine whether a network identified is not available for communications with the mobile node based on whether an indication that a previously sent control signal has been successfully delivered to the identified network.

11. The apparatus of claim 10 wherein the previously sent control signal is generated as part of registration procedure.

12. The apparatus of claim 9 wherein said selector is configured to increase the wait period based on a number of unsuccessful attempts to access the network.

13. The apparatus of claim 9 wherein said determiner is configured to make determination that the identified network is not available for communications with the mobile node when the mobile node is not able to access a selected logical layer of the network.

14. The apparatus of claim 9 wherein the selected logical layer is one of: an RLC and a MAC layer.

15. An apparatus for facilitating control signaling by a mobile node that communicates by way of a radio link, said apparatus comprising:
   a transmitter configured to generate at least an initial request by the mobile node;
   a search timer; and
   a selector configured to select when to cause generation of at least a first subsequent request absent detection at the mobile node of a response to the initial request, the first subsequent request generated in response to an increased search-timer wait period, based on a determined network unavailability that defines a wait time for the generation of the first subsequent request.

16. The apparatus of claim 15 wherein said selector comprises selecting to delay generation of the at least the first subsequent request for a selected wait time absent the detection of the response.

17. The apparatus of claim 15 further comprising a determiner configured to determine whether the response to the initial request is returned to the mobile node.

18. The apparatus of claim 15 wherein the at least the initial request comprises a plurality of prior requests and wherein selection made by said selector is at least partially dependent upon the number of prior requests.

19. The method of claim 4 wherein initiating a network search procedure is performed at the expiry of the search timer.

20. A method for a mobile node operable to communicate with a network comprising:
   determining whether a network identified is not available for communications with the mobile node;
   increasing a wait period associated with a network search procedure based on a determination that the identified network is not available for communications with the mobile node;
   identifying, based on the network search procedure, another network for communications with the mobile node; and
   initiating a network search procedure at the expiry of the wait period.

21. An apparatus for a mobile node operable to communicate with a network, said apparatus comprising:
   a determiner configured to determine whether a network identified is not available for communications with the mobile node;
   a search timer configured to set a wait period; and
   a selector configured to increase a wait period associated with a network search procedure by increasing the wait period of said search timer based on a determination by said determiner that the identified network is not available for communications with the mobile node and to initiate a network search procedure at the expiry of the wait period.

* * * * *